(12) United States Patent
Charbonneau et al.

(10) Patent No.: US 9,492,831 B2
(45) Date of Patent: Nov. 15, 2016

(54) METHODS AND SYSTEMS FOR DESTABILIZING FOAM IN EQUIPMENT DOWNSTREAM OF A SUBMERGED COMBUSTION MELTER

(71) Applicant: JOHNS MANVILLE, Denver, CO (US)

(72) Inventors: Mark William Charbonneau, Lakewood, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 192 days.

(21) Appl. No.: 13/644,058

(22) Filed: Oct. 3, 2012

(65) Prior Publication Data

US 2014/0090422 A1    Apr. 3, 2014

(51) Int. Cl.
| | |
|---|---|
| *C03B 5/225* | (2006.01) |
| *C03B 5/235* | (2006.01) |
| *B05B 1/34* | (2006.01) |
| *C03B 5/20* | (2006.01) |

(52) U.S. Cl.
CPC ............ *B05B 1/3405* (2013.01); *C03B 5/202* (2013.01); *C03B 5/225* (2013.01); *C03B 5/235* (2013.01); *C03B 5/2356* (2013.01)

(58) Field of Classification Search
None
See application file for complete search history.

(56) References Cited

U.S. PATENT DOCUMENTS

| | | |
|---|---|---|
| 1,716,433 A | 6/1929 | McKelvey et al. |
| 1,989,103 A | 1/1935 | McKelvey et al. |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,597,585 A | 5/1952 | Howard |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |

(Continued)

FOREIGN PATENT DOCUMENTS

| | | |
|---|---|---|
| DE | 44 24 814 A1 | 1/1996 |
| DE | 100 29 963 C2 | 9/2003 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Lisa Herring
(74) *Attorney, Agent, or Firm* — Robert D. Touslee

(57) ABSTRACT

Methods and systems for de-stabilizing foam produced in submerged combustion melters. A molten mass of glass and bubbles is flowed into an apparatus downstream of a submerged combustion melter. The downstream apparatus includes a floor, a roof and a wall connecting the floor and roof, but is devoid of submerged combustion burners and other components that would increase turbulence of the molten mass. The molten mass has foam on at least a portion of a top surface of the molten mass. One method includes directly impinging an impinging composition onto at least a portion of the foam in the downstream apparatus. Systems for carrying out the methods are described.

9 Claims, 9 Drawing Sheets

(56) References Cited

U.S. PATENT DOCUMENTS

| | | |
|---|---|---|
| 2,981,250 A | 4/1961 | Stewart |
| 3,020,165 A | 2/1962 | Davie |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,188 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,245,769 A | 4/1966 | Eck et al. |
| 3,248,205 A | 4/1966 | Dolf et el |
| 3,260,587 A | 7/1966 | Dolf at al |
| 3,268,313 A | 8/1966 | Burgman at al |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et al. |
| 3,402,026 A | 9/1968 | Garrett et ai |
| 3,407,805 A | 10/1968 | Bougard |
| 3,407,962 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,649,235 A | 3/1972 | Harris |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneur |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,599,100 A * | 7/1986 | Demarest, Jr. ............... 65/134.4 |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,780,122 A | 10/1988 | Schwenninger et al. |
| 4,798,616 A | 1/1989 | Knavish et al. |
| 4,814,387 A | 3/1989 | Donat |
| 4,816,056 A * | 3/1989 | Tsai et al. ..................... 65/134.4 |
| 4,877,436 A | 10/1989 | Sheinkop |
| 4,882,736 A | 11/1989 | Pieper |
| 4,886,539 A | 12/1989 | Gerutti et al. |
| 4,919,700 A | 4/1990 | Pecoraro et al. |
| 4,927,886 A | 5/1990 | Backderf et al. |
| 4,953,376 A | 9/1990 | Merlone |
| 4,973,346 A * | 11/1990 | Kobayashi ................... 65/134.4 |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh, Jr. et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |

(56) References Cited

U.S. PATENT DOCUMENTS

| | | |
|---|---|---|
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,318,126 B1 | 11/2001 | Takei et al. |
| 6,332,339 B1 | 12/2001 | Kawaguchi et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,398,547 B1 | 6/2002 | Joshi et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,470,710 B1 | 10/2002 | Takei et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 2001/0039813 A1* | 11/2001 | Simpson et al. ............ 65/134.4 |
| 2002/0086077 A1 | 7/2002 | Noller et al. |
| 2002/0134112 A1* | 9/2002 | Barrow et al. ............ 65/134.4 |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0054301 A1* | 3/2003 | Borders ............ F23D 14/22 431/8 |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2005/0236747 A1* | 10/2005 | Rue et al. ............ 266/217 |
| 2006/0000239 A1 | 1/2006 | Jeanvoine et al. |
| 2006/0174655 A1 | 8/2006 | Kobayashi et al. |
| 2006/0177785 A1* | 8/2006 | Varagani et al. ............ 431/12 |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1* | 4/2011 | Purnode et al. ............ 65/181 |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |

(56) References Cited

U.S. PATENT DOCUMENTS

| 2013/0086952 A1 | 4/2013 | Charbonneau et al. |
| 2014/0090421 A1 | 4/2014 | Shock et al. |

FOREIGN PATENT DOCUMENTS

| DE | 10 2005 033330 B3 | 8/2006 |
| EP | 0 181 248 B1 | 10/1989 |
| EP | 1 337 789 B1 | 12/2004 |
| EP | 2 133 315 A1 | 12/2009 |
| EP | 1 986 966 B1 | 4/2010 |
| EP | 1 667 934 B1 | 2/2011 |
| EP | 2 397 446 A2 | 12/2011 |
| EP | 2 433 911 A1 | 3/2012 |
| EP | 2 578 548 A2 | 4/2013 |
| FR | 2 740 860 A1 | 9/1997 |
| GB | 191301772 | 0/1914 |
| GB | 191407633 | 0/1914 |
| GB | 164073 A | 5/1921 |
| GB | 959 895 A | 6/1964 |
| GB | 1449439 | 9/1976 |
| GB | 2 424 644 A | 10/2006 |
| IT | 1208172 | 7/1989 |
| KR | 2000 0050572 A | 5/2000 |
| RO | 114827 | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012125665 A1 | 9/2012 |
| WO | 2013188167 A1 | 12/2013 |

OTHER PUBLICATIONS

Rue, "Energy-Efficient Glass Melting—The Next Generation Melter", Gas Technology Institute, Project No. 20621 Final Report, 2008.
U.S. Appl. No. 12/817,754, filed Jun. 17, 2010, Huber.
U.S. Appl. No. 12/888,970, field Sep. 23, 2010, Charbonneau.
U.S. Appl. No. 13/267,990, filed Oct. 7, 2010, Shock et al.
U.S. Appl. No. 13/268,028, filed Oct. 7, 2010, Charbonneau.
U.S. Appl. No. 13/268,065, filed Oct. 7, 2010, Charbonneau et al.
U.S. Appl. No. 13/268,098, filed Oct. 7, 2010, Huber et al.
U.S. Appl. No. 13/268,130, filed Oct. 7, 2010, Charbonneau et al.
U.S. Appl. No. 13/458,211, filed Apr. 27, 2012, Mobley et al.
U.S. Appl. No. 13/493,170, filed Jun. 11, 2012, Huber et al.
U.S. Appl. No. 13/493,219, filed Jun. 11, 2012, Charbonneau.
"Glass Industry of the Future", Sep. 30, 2008, United States Department of Energy, report 20-GA50113-03, pp. 1-17.
Stevenson, "Foam Engineering: Fundamentals and Applications", Published 2012, Chapter 16, John Wiley & Sons, Ltd.
Clare et al., "Density and Surface Tension of Borate Containing Silicate Melts", Glass Technology, 2003, 44(2), pp. 59-62.
Seward, T.P., "Modeling of Glass Making Processes for Improved Efficiency", DE-FG07-96EE41262, Final Report, Mar. 31, 2003.
Conradt et al, Foaming behaviour on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 1991, 74(3), pp. 551-555.
Kim et al., "Foaming in Glass Melts Produced by Sodium Sulfate Decomposition under Ramp Heating Conditions", Journal of the American Ceramic Society, 1992, 75(11), pp. 2959-2963.
Kim et al., "Effect of Furnace Atmosphere of E-glass Foaming", Journal of Non-Crystalline Solids, 2006, 352(50/51), pp. 5287-5295.
Van Limpt, et al., "Modelling the evaporation of boron species. Alkali-free borosilicate glass melts", Glass Technology—European Journal of Glass Science and Technology, Part 1, Jun. 2011, 52(3), pp. 77-87.
U.S. Appl. No. 13/540,771, filed Jul. 3, 2012, Charbonneau et al.
U.S. Appl. No. 13/633,998, filed Oct. 3, 2012, Charbonneau et al.
U.S. Appl. No. 13/633,979, filed Oct. 3, 2012, Charbonneau et al.
U.S. Appl. No. 13/644,104, filed Oct. 3, 2012, Charbonneau et al.
U.S. Appl. No. 13/644,039, filed Oct. 3, 2012, Shock et al.
"AccuTru Temperature Measurement," AccuTru International Corporation, 2003.
"Glass Melting Technology—A Technical and Economic Assessment," 2004, U.S. Department of Energy, pp. 1-292.
"Canty Process Technology" brochure, date unknown, Apr. 2012 at American Institute of Chemical Engineers, Spring Meeting, Houston, TX.
Olabin, V.M. et al. "Submerged Combustion Furnace for Glass Melts," Ceramic Engineering and Science Proceedings, Jan. 1, 1996, pp. 84-92, vol. 17—No. 2, American Ceramic Society Inc., US.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company, release date, 1995.
Report for Treating Hanford LAW and WTP SW Simulants: Pilot Plant Mineralizing Flowsheet Apr. 2009, Department of Energy Environmental Managment Consolidated Business Center by THOR Treatment Technologies, LLC.

\* cited by examiner

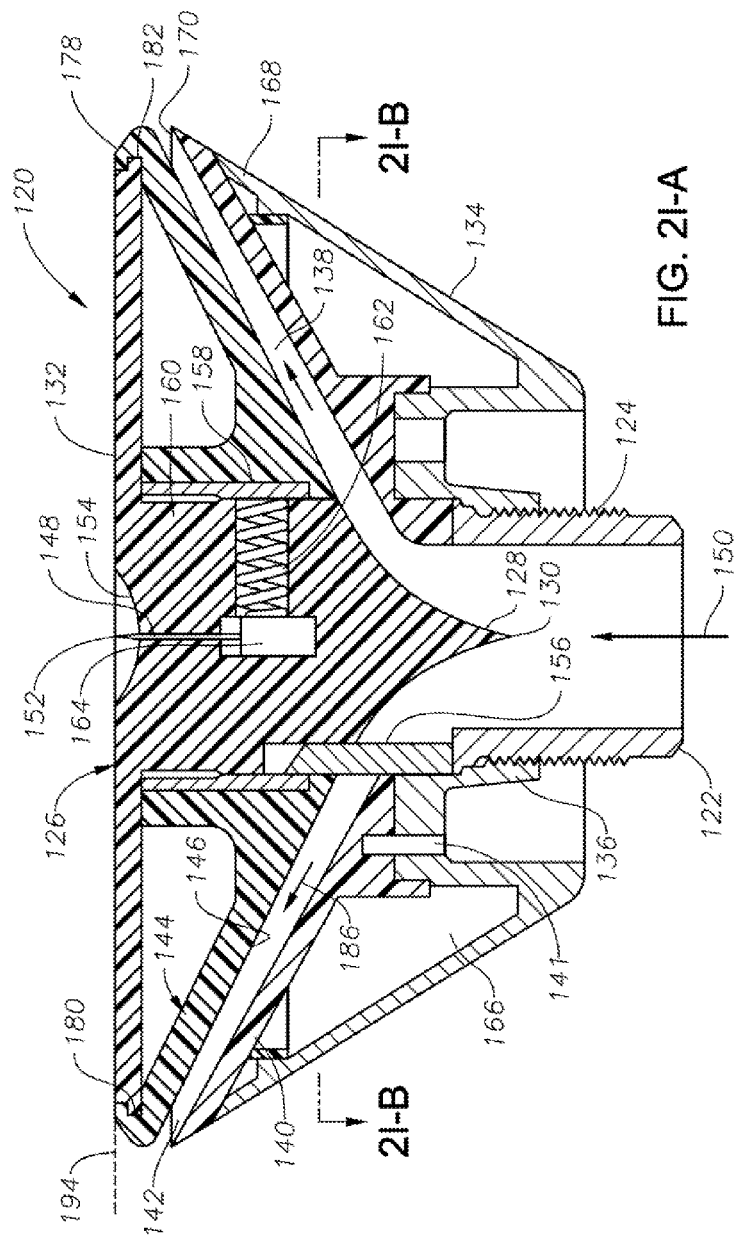

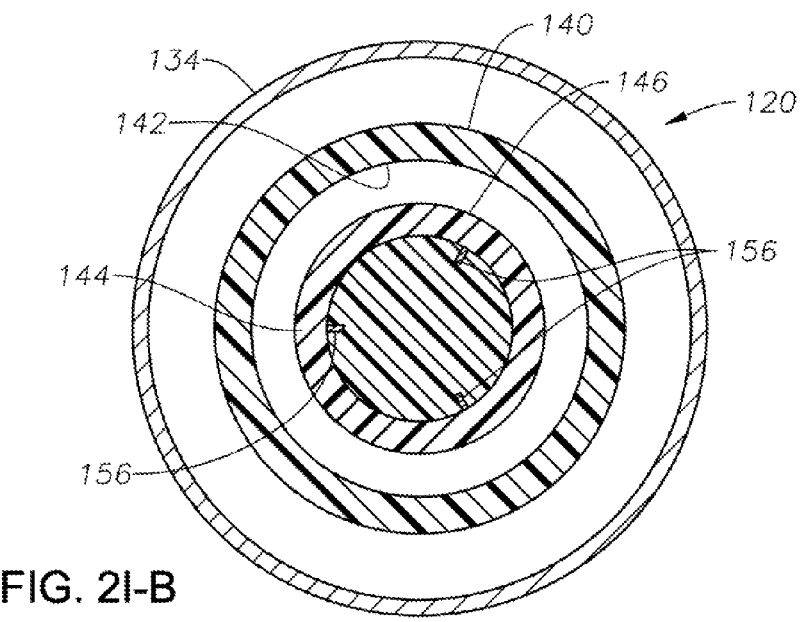
FIG. 2I-B
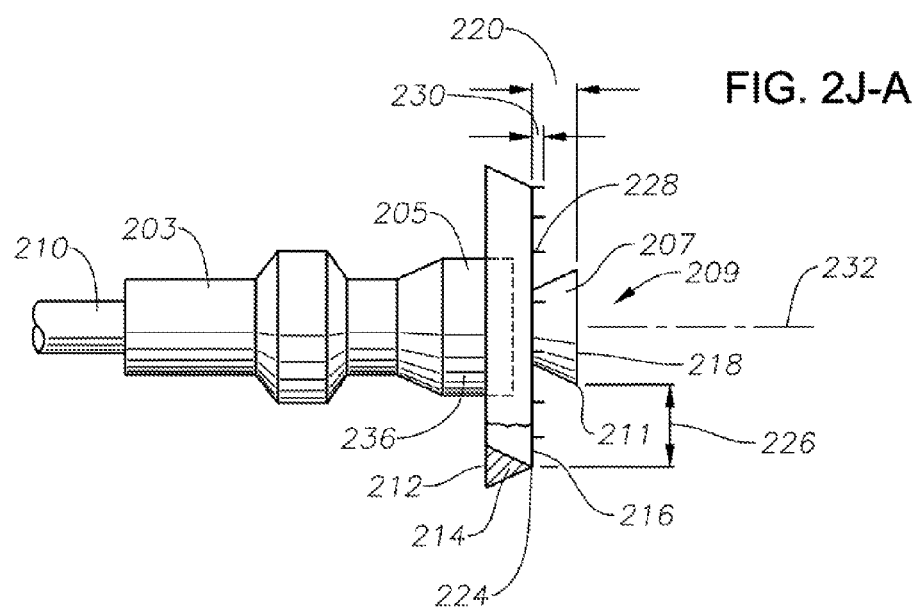
FIG. 2J-A

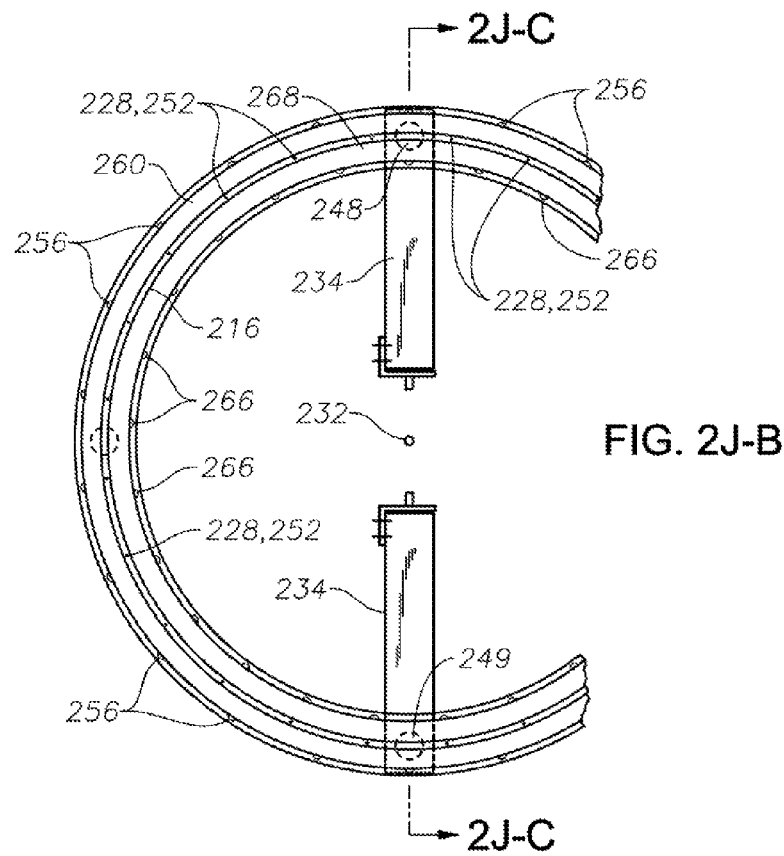
FIG. 2J-B
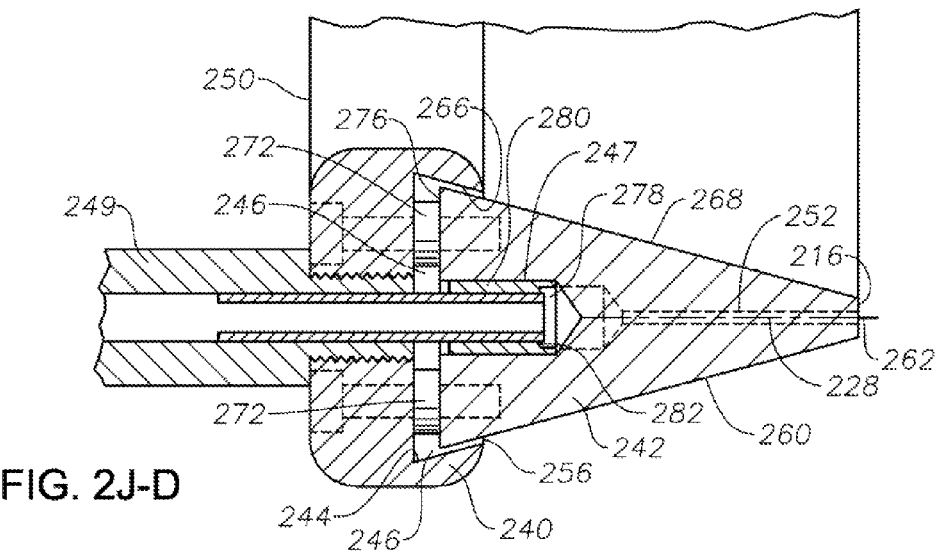
FIG. 2J-D

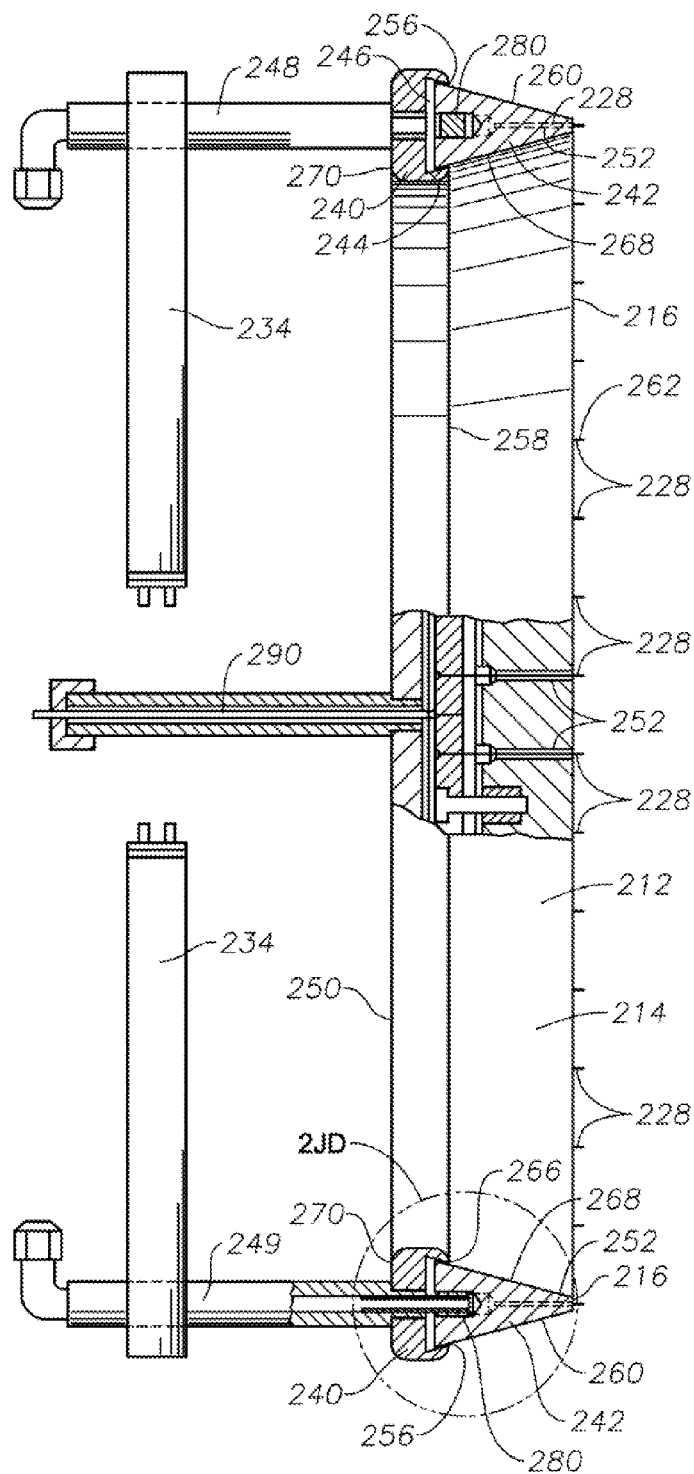
FIG. 2J-C

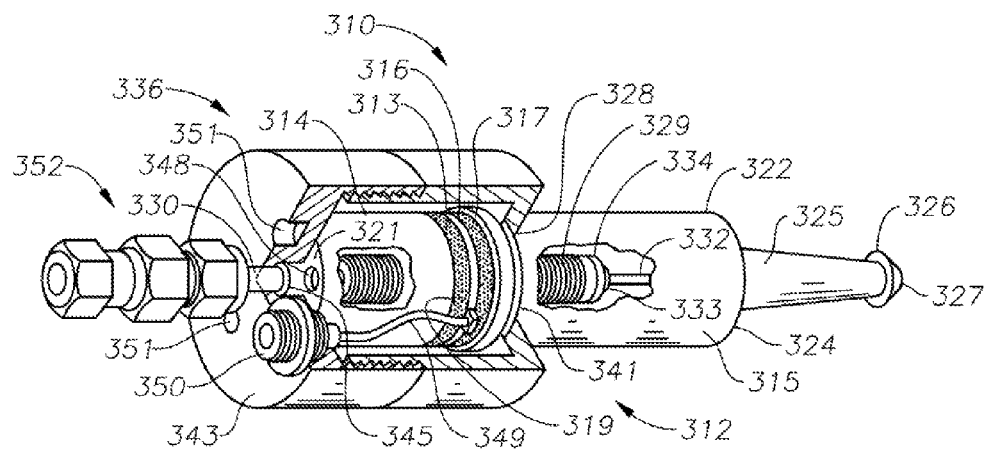
FIG. 2K-A
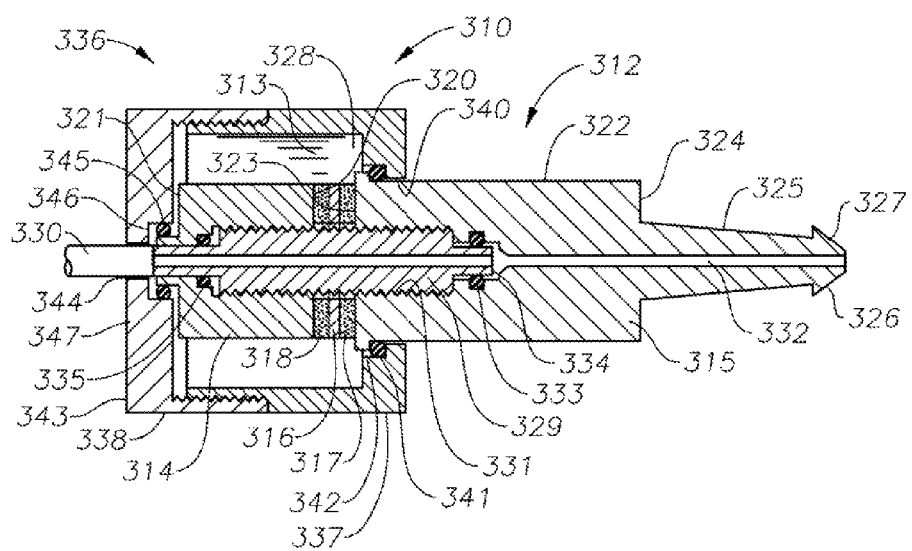
FIG. 2K-B

METHODS AND SYSTEMS FOR DESTABILIZING FOAM IN EQUIPMENT DOWNSTREAM OF A SUBMERGED COMBUSTION MELTER

CROSS-REFERENCE TO RELATED APPLICATIONS

This application may be related to the following United States non-provisional patent applications assigned to the assignee of the present application which are all incorporated by reference herein: Ser. No. 12/817,754, filed Jun. 17, 2010 (now U.S. Pat. No. 8,769,992); Ser. No. 13/267,990 (now U.S. Pat. No. 8,997,525), Ser. No. 13/268,028 (now U.S. Pat. No. 8,875,544), Ser. No. 13/268,098 (now U.S. Pat. No. 8,707,740), and Ser. No. 13/268,130 (now U.S. Pat. No. 9,021,838), all four filed Oct. 7, 2011; Ser. No. 13/458,211, filed Apr. 27, 2012; Ser. No. 13/493,170 (now U.S. Pat. No. 8,707,739) and Ser. No. 13/493,219, both filed Jun. 11, 2012; Ser. No. 13/540,771, filed Jul. 3, 2012 (now U.S. Pat. No. 9,032,760); and Ser. No. 13/633,998 now U.S. Pat. No. 8,973,405); Ser. Nos. 13/633,979; 13/644,039 (now U.S. Pat. No. 8,991,215); and Ser. No. 13/644,104, all filed Oct. 3, 2012.

BACKGROUND INFORMATION

Technical Field

The present disclosure relates generally to the field of combustion furnaces and methods of use to produce glass, and more specifically to methods and systems to destabilize foam in glass handling equipment downstream of a submerged combustion melter.

Background Art

A submerged combustion melter (SCM) may be employed to melt glass batch materials to produce molten glass by passing oxygen, oxygen-enriched mixtures, or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence, and possibly foaming. Submerged combustion has been proposed in several patents and patents for application in commercial glass melting, including U.S. Pat. Nos. 4,539,034; 3,170,781; 3,237,929; 3,260,587; 3,606,825; 3,627,504; 3,738,792; 3,764,287; 6,460,376; 6,739,152; 6,854,290; 6,857,999; 6,883,349; 7,273,583; 7,428,827; 7,448,231; and 7,565,819; and U.S. Publication Nos. 2004/0168474; 2004/0224833; 2007/0212546; 2006/0000239; 2002/0162358; 2009/0042709; 2008/0256981; 2008/0276652; 2007/0122332; 2004/0168474; 2004/0224833; 2007/0212546; 2011/0308280; and 2012/0077135. Certain SCMs and/or flow channels may employ one or more high momentum burners, for example, to impinge on portions of a foam layer. High momentum burners are disclosed assignee's patent application U.S. Ser. No. 13/268,130, filed Oct. 7, 2011. "High momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

Often it is a primary goal to melt batch or other feed materials in an SCM as quickly and with as small a footprint SCM as possible. Although this is still desired for the most part, one drawback to this strategy in known submerged combustion systems and methods of melting glass-forming materials using an SCM is the tendency of the foam formed in the SCM to be resistant to destruction or even reduction. This may cause one or more problems in equipment downstream of the SCM, for example, glass conditioning and transport may be hindered as the foam layer may serve as an insulator and may limit the amount of energy capable of being transferred to the molten glass to maintain its temperature. Foam found in (or on top of) glasses typically exists as stable tetrahedral bubbles which need an outside influence to de-stabilize them and therefore break the foam, allowing heat transfer into the glass from burners located above the glass line. In addition, the foam may be destructive of forehearth heating systems and construction materials. In extreme cases, the foam may cause systems to require shutdown, maintenance and may result in a process upset. Attempts to reduce the foam through process adjustments, summarized in "Glass Industry of the Future", U.S. Dept. of Energy, Report 02-GA50113-03, Sep. 30, 2008, such as use of helium and steam to scavenge and consolidate bubbles, sonic methods to consolidate bubbles, vacuum to increase bubble size, and centrifugal force have not met with complete success in reducing foam to an acceptable amount.

It would be an advance in the glass manufacturing art if foam produced during submerged combustion melting of glass-forming materials could be de-stabilized, reduced, or even completely destroyed in equipment downstream of the SCM.

SUMMARY

In accordance with the present disclosure, methods and systems are described which reduce or overcome one or more of the above problems.

A first aspect of the disclosure is a method comprising:

flowing a molten mass of glass and bubbles into an apparatus downstream of a submerged combustion melter, the downstream apparatus comprising a floor, a roof and a wall connecting the floor and roof, the downstream apparatus devoid of submerged combustion burners and other components that would increase turbulence of the molten mass, the molten mass having foam on at least a portion of a top surface of the molten mass; and directly impinging an impinging composition comprising a majority of gas onto at least a portion of the foam in the downstream apparatus, the impinging composition produced by a process selected from the group consisting of:

i) combusting a fuel and an oxidant in one or more low momentum combustion burners positioned in the roof, the wall, or both to produce low momentum combustion products, ii) discharging one or more fluids or slurries from one or more non-combustion nozzles positioned in the roof, the wall, or both, iii) routing one or more fluids or slurries from one or more apertures in the roof, the wall, or both, and iii) combinations of any two or more of (i)-(iii).

A second aspect of the disclosure is a system comprising:

an apparatus configured to be fluidly connected downstream of a submerged combustion melter, the downstream apparatus comprising a floor, a roof, a wall structure connecting the floor and roof, the floor, roof, and wall structure defining an internal space configured to contain a flowing or non-flowing molten mass of glass and foam, the apparatus devoid of submerged combustion burners and other components that would increase turbulence of the molten mass, the molten mass having foam on at least a portion of a top surface of the molten mass; and one or more foam direct impingement components for directing an impinging composition comprising a majority of gas onto at least a portion of the foam in the apparatus, the direct impingement components selected from the group consisting of:
  i) one or more low momentum combustion burners positioned in the roof, the wall, or both to produce low momentum combustion products by combusting a fuel and an oxidant therein;
  ii) one or more non-combustion nozzles positioned in the roof, the wall, or both configured to discharge one or more fluids or slurries therefrom;
  iii) one or more apertures in the roof, the wall, or both configured to route one or more fluids or slurries onto at least a portion of the foam, and
  iii) combinations of any two or more of (i)-(iii).

Methods and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIG. 2I-A is a schematic longitudinal cross-sectional view of another nozzle useful in the system illustrated schematically in FIG. 1C, and FIG. 2I-B is a transverse cross-sectional view of the nozzle illustrated schematically in FIG. 2I-A;

FIG. 2J-A is a schematic side elevation view partially in cross-section, and FIG. 2J-B is a schematic end elevation view, of another nozzle embodiment useful in the system illustrated schematically in FIG. 1C; FIG. 2J-C is a schematic cross-sectional view, partially in cross-section, along the line "2J-C-2J-C" of FIG. 2J-B; and FIG. 2J-D is an enlarged schematic cross-sectional view of a portion of the nozzle illustrated schematically in FIG. 2J-C;

FIGS. 2K-A is a schematic perspective view, with portions broken away, of another nozzle useful in systems such as illustrated schematically in FIG. 1C, and FIG. 2K-B is a schematic longitudinal cross-sectional view of the nozzle of FIG. 2K-A.

Figure 1A:
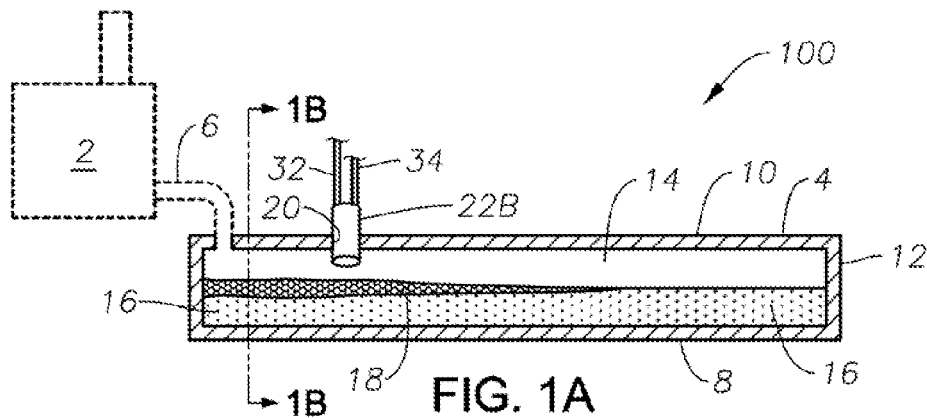
FIG. 1A is a schematic side elevation view, partially in cross-section, of one system in accordance with the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to present submerged combustion melting systems and methods is that the foam formed in the SCM may cause one or more problems in equipment downstream of the SCM, for example, glass conditioning and transport may be hindered as the foam layer may serve as an insulator and may limit the amount of energy capable of being transferred to the molten glass to maintain its temperature. Foam found in (or on top of) molten glasses typically exists as stable tetrahedral bubbles which need an outside influence to de-stabilize them and therefore break the foam.

Applicants have discovered certain methods and systems that may reduce or eliminate such shortcomings.

Various terms are used throughout this disclosure. "Submerged" as used herein means that combustion gases emanate from a combustion burner exit that is under the level of the molten glass; and "non-submerged" means that combustion gases do not emanate from combustion burner exits under the level of molten glass. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The phrase "low momentum" as used in the contexts of "low momentum combustion burners" and "low momentum combustion products" means combustion burners configured to have a fuel velocity ranging from about 6 ft./second or less to about 40 ft./second (about 2 meters/second to about 12 meters/second) and an oxidant velocity ranging from about 6 ft./second or less to about 40 ft./second (about 2 meters/second to about 12 meters/second).

The term "composition" includes one or more gases, one or more liquids or solids that may evolve a gas or become gaseous under the high temperature conditions associated with submerged combustion melting, one or more particulate solids, and combinations of thereof, including slurries, mixtures of a gas and solid particles, and the like.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "downstream apparatus" means a container, channel or conduit defined at least by a floor and a wall structure extending upwards from the floor to form a space in which molten glass may be present, whether flowing or not. In certain embodiments the downstream apparatus will include a roof and a wall structure connecting the floor and roof. The downstream apparatus may have any operable cross-sectional shape (for example, but not limited to, rectangular, oval, circular, trapezoidal, hexagonal, and the like) and any flow path shape (for example, but not limited to, straight, zigzag, curved, and combinations thereof). In certain systems and methods the downstream apparatus may be a flow channel selected from the group consisting of a conditioning channel, a distribution channel, and a forehearth.

Conduits used in burners and devices for delivery of compositions useful in systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and flow channels, and refractory burner blocks (if used), include fused zirconia ($ZrO_2$), fused cast AZS (alumina-zirconia-silica), rebonded AZS, or fused cast alumina ($Al_2O_3$). The particular system and method, downstream apparatus, burner geometry, foam de-stabilization apparatus, and type of glass to be produced may all dictate the choice of a particular material, among other parameters.

Certain submerged and non-submerged combustion burners and foam de-stabilization apparatus useful in systems and methods of this disclosure may be fluid-cooled, and may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid.

Certain systems of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the downstream apparatus.

In certain systems, one or more burners may be adjustable with respect to direction of flow of the combustion products. Adjustment may be via automatic, semi-automatic, or manual control. Certain system embodiments may comprise a burner mount that mounts the burner in the wall structure, roof, or floor of the downstream apparatus comprising a refractory or refractory-lined ball joint. Other burner mounts may comprise rails mounted in slots in the wall or roof. In yet other embodiments the burners may be mounted outside of the downstream apparatus, on supports that allow adjustment of the combustion products flow direction. Useable supports include those comprising ball joints, cradles, rails, and the like.

In certain systems and methods of the present disclosure, the downstream apparatus may comprise a flow channel comprising a series of sections, and may comprise one or more skimmers and/or impingement (high momentum) burners, such as described in assignee's co-pending U.S. application Ser. No. 13/268,130, filed Oct. 7, 2011 (now U.S. Pat. No. 9,021,838), and Ser. No. 13/493,170, filed Jun. 11, 2012 (now U.S. Pat. No. 8,707,739). Certain systems and methods of the present disclosure may utilize measurement and control schemes such as described in assignee's co-pending application Ser. No. 13/493,219, filed Jun. 11, 2012, and/or feed batch densification systems and methods as described in assignee's co-pending application Ser. No. 13/540,704, filed Jul. 3, 2012. Certain systems and methods of the present disclosure may utilize devices for delivery of treating compositions such as disclosed in assignee's co-pending application Ser. No. 13/633,998, filed Oct. 3, 2012 (now U.S. Pat. No. 8,973,405).

Certain system and method embodiments of this disclosure may be controlled by one or more controllers. For example, burner or pulsed detonation device combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a controller which receives one or more input parameters selected from temperature of melt, composition of bubbles and/or foam, height of foam layer, and combinations thereof, and may employ a control algorithm to control combustion temperature, flow rate and/or composition of foam de-stabilization compositions, and other output parameters based on one or more of these input parameters.

Specific non-limiting system and method embodiments in accordance with the present disclosure will now be presented in conjunction with the attached drawing figures. The same numerals are used for the same or similar features in the various figures. In the views illustrated in the drawing figures, it will be understood in each case that the figures are schematic in nature, and certain conventional features may not be illustrated in all embodiments in order to illustrate more clearly the key features of each embodiment. The geometry of forehearth 4 or other downstream apparatus is illustrated generally the same in the various embodiments, but that of course is not necessary.

Figure 1B:
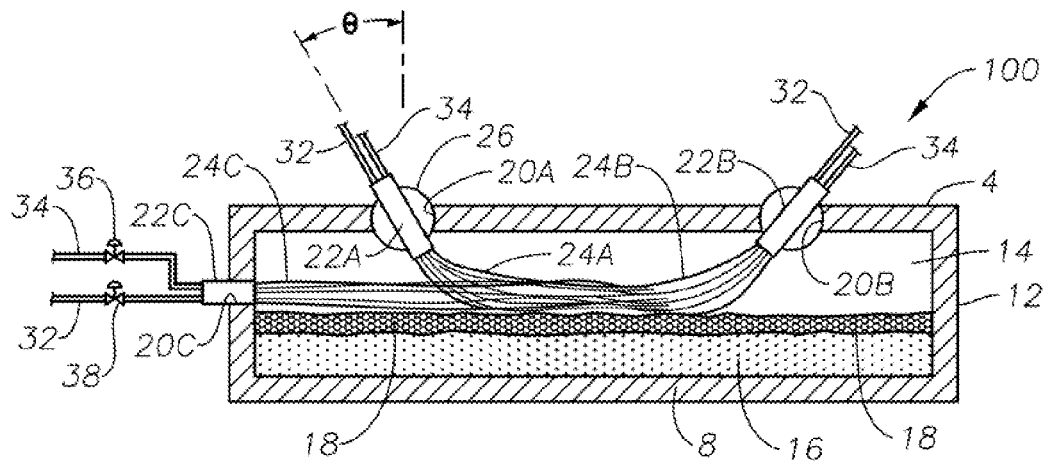
FIG. 1B is a schematic transverse cross-section of the embodiment in FIG. 1A.
Figure 1C:
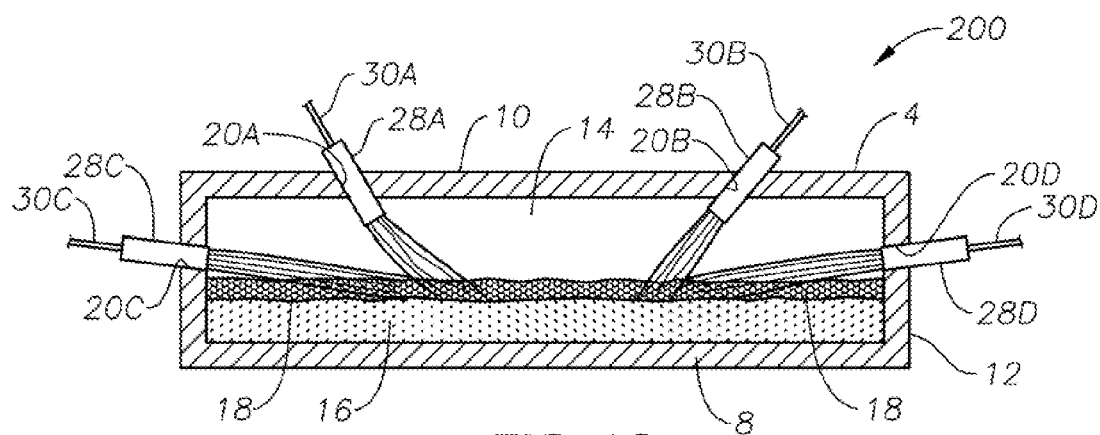
FIGS. 1C and 1D are schematic transverse cross-sectional views of two alternative embodiments of the system of FIGS. 1A-B.
Figure 1D:
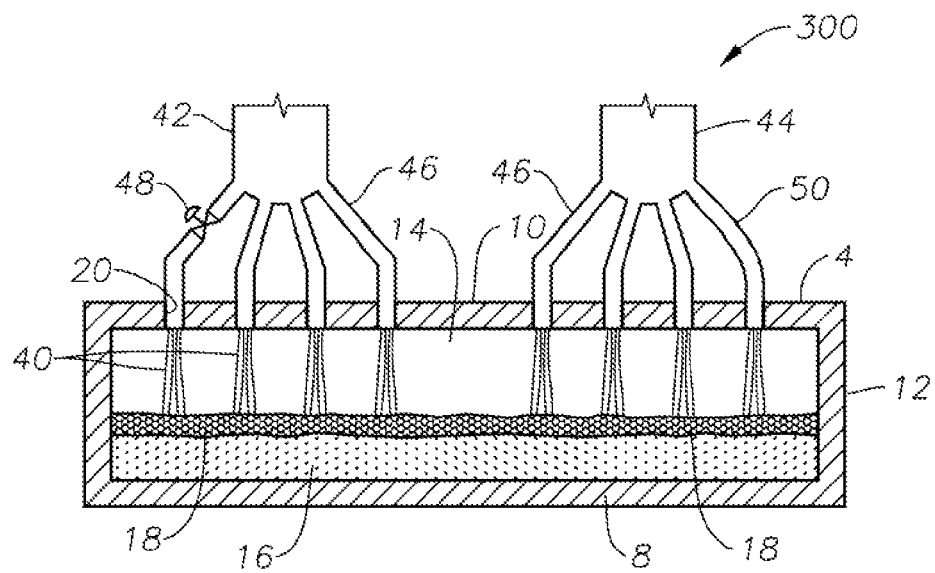

FIG. 1A is a schematic side elevation view, partially in cross-section, of one system embodiment 100 in accordance with the present disclosure, and FIG. 1B is a schematic transverse cross-section of embodiment 100. FIGS. 1C and 1D are schematic transverse cross-sectional views of two alternative embodiments 200 and 300. In all of the drawing figures where an SCM is illustrated, such as at 2 in FIG. 1A, the SCM is illustrated in dashed lines, indicating that the SCM is not, strictly speaking, a part of the systems of the present disclosure. However, certain systems and methods may be described as comprising an SCM and one or more downstream apparatus receiving flow of molten glass and foam from the SCM. Molten glass and foam produced in SCM 2 flow into a forehearth or other downstream apparatus 4 via a melter exit structure 6, also illustrated in dashed lines. Downstream apparatus 4 comprises in this embodiment a floor 8, a roof 10, and a sidewall structure 12 connecting floor 8 and roof 10, and these components define an internal space 14 that confines a flowing or non-flowing mass of molten glass 16 having a foam layer 18 generally on a top surface thereof. In certain embodiments, roof 10 may not be present. One or more apertures 20 in roof 10 and/or wall structure 12 may be present as described herein.

SC burners in SCM 2 produce a turbulent melt comprising bubbles having a bubble atmosphere. In general the atmosphere of the bubbles is about the same from bubble to bubble, but that is not necessarily so. The bubbles form bubble layer 18 in downstream apparatus 4. One or more SC burners in SCM 2 may be oxy/fuel burners. SCM 2 may receive numerous feeds through one or more inlet ports, and batch feeders maybe provided. Other feeds are possible, such as glass mat waste, wound roving, waste materials, and the like, such as disclosed in assignee's application U.S. Ser. No. 12/888,970, filed Sep. 23, 2010 (published as U.S. Publication No. 2012/0077135 on Mar. 29, 2012).

Still referring to FIGS. 1A and 1B, one or more low momentum non-submerged burners 22A, 22B, and 22C may be positioned in respective ports 20A, 20B, and 20C to impinge combustion product streams 24A, 24B, and 24C upon a portion of foam layer 18, as illustrated schematically in FIG. 1B. Burners 22 may take feed from supplies of oxidant and fuel through conduits 32, 34, respectively, although in certain air/fuel burners conduit 34 may not be required. As illustrated schematically in FIG. 1B, low momentum non-submerged burners 22 may be independently positioned at an angle "θ" with respect to vertical using a refractory (or refractory-lined) ball joint 26. Angle θ may vary from 0 to about 70 degrees, or from 0 to about 45 degrees, and may vary from burner to burner. Low momentum non-submerged burners 22 tend to have longer flames than high momentum burners, and this characteristic may be used to advantage in system sand methods of the present disclosure. Although certain systems and methods of the present disclosure may include one or more high momentum non-submerged burners, care must be taken to position any high momentum non-submerged burners present so as to not significantly modify the combustion product streams emanating from the low momentum non-submerged burners, and the latter's ability to impact foam layer 18.

Another feature of embodiment 100, and which may be included in many of the system and method embodiments of the present disclosure, is the provision of valves 36, 38 and appropriate valve controls (not illustrated) to pulse or oscillate flow of fuel and/or oxidant to low momentum non-submerged burners 22. The pulsing may be random or non-random, and may provide certain benefits, such as reduced NOx emissions. The principle and the various methods of implementation are broadly described in U.S. Pat. Nos. 4,846,665, 5,302,111, 5,522,721, and U.S. Publication No. 200610177785. The main idea is to pulse the flow of fuel, or oxidant being supplied to at least one burner of the furnace, to generate successive fuel-rich and fuel-lean zones in a flame. In certain embodiments, the flow rate of a main or primary oxidant is controlled by a main oxidant flow rate control unit, and oscillating combustion is generated by oscillating the fuel flow with an oscillating valve and combusting the oscillating fuel with the main oxidant adjacent the burner to produce combustion products. A post-combustion oxidant may also be injected into the combustion products, and a post-combustion oxidant flow rate control unit may control the injection rate of the post-combustion oxidant. The combustion products and the injected post-combustion oxidant are combusted. A rate of the fuel flow may be predetermined. A controller is provided that is operatively associated with the main oxidant flow rate control unit, the oscillating valve, and the post-combustion oxidant flow rate control unit. A value or values associated with one or more combustion parameters (including a rate of flow of the main oxidant, a rate of flow of the post-combustion oxidant, a frequency of the oscillating fuel flow, an amplitude of the oscillating fuel flow, a duty cycle of the oscillating fuel flow) may be determined. The combustion parameter associated with the determined value or values may then be adjusted. The determined value or values may be based upon the predetermined fuel flow rate. The determining step may be performed by the controller.

Referring now to FIG. 1C, another system embodiment 200 is illustrated schematically. Embodiment 200 differs from embodiment 100 illustrated schematically in FIGS. 1A and B by replacing low momentum non-submerged burners 22 with nozzles 28A-D extending through respective apertures 20A-D, and supplied by respective supply conduits 30A-D. Nozzles 28A-D supply one or more non-combustible fluids or slurries to directly impinge upon a portion of foam layer 18, as illustrated schematically in FIG. 1C. The fluids may be selected from high-pressure liquid water, hydrogen, oxygen, nitrogen, noble gases, air, and combinations thereof. Useful slurries may include, but are not limited to, high-pressure liquid water mixed with a glass-forming particulate ingredient, for example, but not limited to, any of the raw materials listed in Table 1 herein for making E-glass.

Figure 2A:
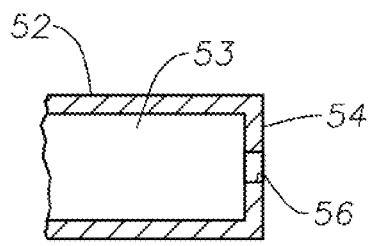
FIGS. 2A-H, inclusive, are schematic longitudinal cross-sectional views of various nozzles useful in the system illustrated in FIG. 1C.
Figure 2B:
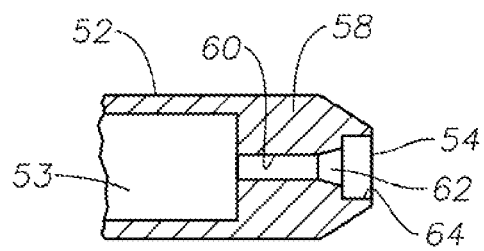
Figure 2C:
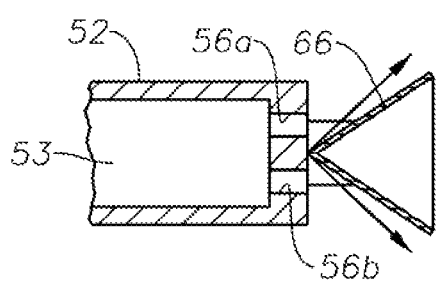

Suitable nozzles for use in systems such as illustrated in FIG. 1C include single-fluid nozzles and multiple-fluid nozzles, and representative examples are schematically illustrated in FIGS. 2A-K. Suitable single-fluid nozzles may include, but are not limited to, plain orifice type nozzles such as illustrated schematically in FIG. 2A, which includes a nozzle body 52 defining a cavity 53, and having an exit end 54 comprising an orifice 56. Suitable single-fluid nozzles may also include shaped orifice nozzles such as illustrated in FIG. 2B, comprising nozzle body 52 and cavity 53, and further comprising a shaped body portion 58 defining a central passage 60 leading fluid or slurry to a hemispherical inlet that expands into a V-notch exit 62, which then routes fluid or slurry through a cylindrical region 64, and finally out exit end 54. The hemispherical shaped inlet and a "V" notched outlet cause the flow to spread out on the axis of the V notch and produce a relatively flat fan spray. Other suitable single-fluid nozzles may include surface impingement fluid nozzles such as illustrated in FIG. 2C, comprising two or more simple orifices 56a, 56b, which route fluid or slurry to impinge on a conical impact surface 66 or other shaped impact surface and form a conical spray. A surface impingement nozzle causes a stream of liquid to impinge on a surface resulting in a sheet of liquid that breaks up into drops.

Figure 2D:
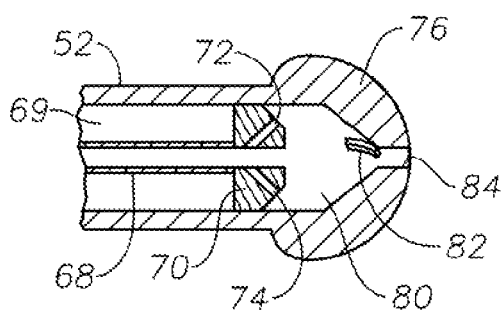
Figure 2E:
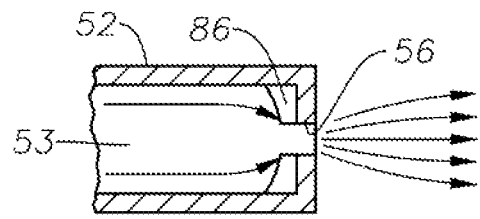

Yet other suitable single-fluid nozzles may include pressure-swirl spray nozzles such as illustrated schematically in FIG. 2D, comprising a central conduit 68 more or less concentric with nozzle body 52, and forming there between a nozzle annulus 69. A nozzle insert 70 includes one or more-small diameter passages 72, 74, which route fluid or slurry into a central chamber 80 defined by a nozzle head 76. One or more swirl plates 82 provide a swirling action to the fluid or slurry passing through this nozzle as the fluid or slurry passes through an exit orifice 84. The spray formed may be a more focused spray than that formed from the nozzles illustrated in FIGS. 2A-C. Pressure-swirl spray nozzles are high-performance (small drop size) devices. The stationary core induces a rotary fluid motion that causes the swirling of the fluid in the swirl chamber. A film is discharged from the perimeter of the outlet orifice producing a characteristic hollow cone spray pattern. Air or other surrounding gas is drawn inside the swirl chamber to form an air core within the swirling liquid. Many configurations of fluid inlets are used to produce this hollow cone pattern depending on the nozzle capacity and materials of construction. A spill-return pressure-swirl single-fluid nozzle is one variety of pressure swirl nozzle includes a controlled return of fluid from the swirl chamber to the feed system. This allows the nozzle pressure drop to remain high while allowing a wide range of operating rates. Solid cone nozzles, such as illustrated schematically in FIG. 2E, produce a "solid" cone spray of fluid or slurry by employing a vane-shaped internal region 86. A swirling liquid motion is induced with the vane structure, however; the discharge flow fills the entire outlet orifice. For the same capacity and pressure drop, a full cone nozzle will produce a larger drop size than a hollow cone nozzle. The coverage is the desired feature for such a nozzle, which is often used for applications to distribute fluid over an area.

Figure 2F:
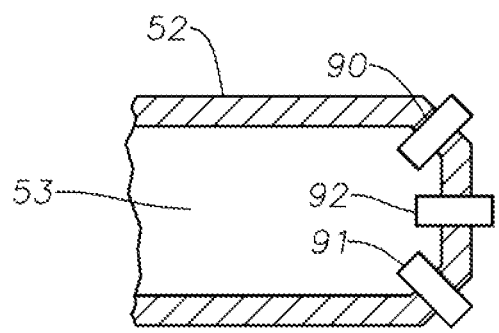
Figure 2G:
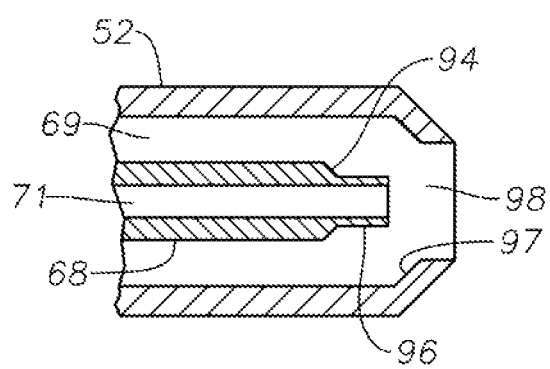

Compound nozzles, such as illustrated in FIG. 2F, and which include one or more of two types of the nozzles illustrated in FIGS. 2A-E, may also be suitable. The compound nozzle illustrated in FIG. 2F includes two plain orifice nozzles 90, 91, and one centrally located shaped orifice nozzle 92, such as illustrated in FIG. 2B. Compound nozzles allow control of drop size and spray coverage angle.

Figure 2H:
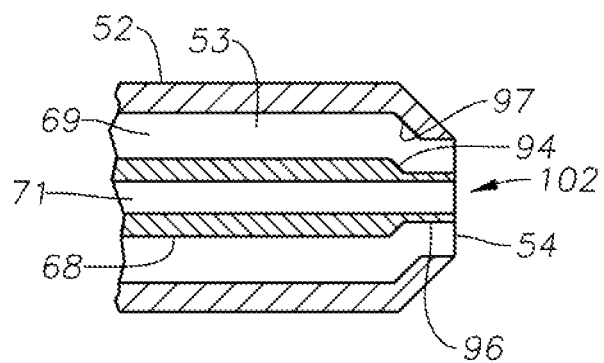

Suitable multiple-fluid nozzles include both internal-mix multiple fluid nozzles and external-mix multiple-fluid nozzles. One example of an internal-mix multiple fluid nozzle is illustrated schematically in FIG. 2G, and comprises a nozzle body 52, a central conduit 68, forming there between a nozzle annulus 69 through which flows a first fluid or slurry. A second fluid or slurry flows though central passage 71 of central conduit 68. Central conduit 68 includes a tapered section 94, followed by a cylindrical end section 96 which forms an exit for central passage 71. Nozzle body 52 also has a tapered section 97, which forces the first fluid or slurry to change course and mix with the second fluid or slurry in an internal mixing region 98. FIG. 2H illustrates schematically an example of a suitable external-mix multiple-fluid nozzle, which is similar structurally to the nozzle illustrated schematically in FIG. 2G, except that central conduit 68 is moved so that its exit orifice is generally co-planar with the exit end 54 of nozzle body 52, forming an external mixing zone 102 where the first and second fluids or slurries may mix.

As used herein the term "nozzle" includes atomizers, and suitable atomizers that may be used in systems and methods of the present disclosure include, but are not limited to, rotary atomizers (such as illustrated in FIG. 2I), electrostatic atomizers (such as illustrated in FIG. 2J), and ultrasonic atomizers (such as illustrated in FIG. 2K). One example of a rotary atomizer is provided schematically in FIGS. 2I-A and B, which is described in U.S. Pat. No. 6,578,779. Rotary atomizers use a high speed rotating disk, cup or wheel to discharge liquid at high speed to the perimeter, forming a hollow cone spray. The rotational speed controls the drop size. The rotary bell element or bell cup 120 for a rotary atomizer illustrated in FIGS. 2I-A and B includes a tube 122 which is externally threaded at 124 to be threadably received on the rotary bearing of a rotary atomizer and is electrically connected to the atomizer to electrostatically charge fluid or slurry sprayed by the rotary bell as described below. Rotary bell element 120 further includes a deflector or diverter 126 that includes a generally conical concave distribution surface 128 having a deflection tip 130 which is opposed to and extends into the outlet of tube 122 as illustrated in FIG. 2I-A. In this embodiment, the distribution surface 128 of deflector 126 is integrally formed with a non-conductive end surface or plate 132 that may be formed of a polymer having a low coefficient of friction, such as polytetrafluoroethylene, or TEFLON™. Rotary bell element 120 further includes a rear housing 134 that, in the disclosed embodiment, includes a female threaded portion 136, which is threadably supported on the threaded portion 124 of tube 122. Fluid or slurry entering tube 122 is received by the generally conical distribution surface 128 and directed radially and axially into an annular generally conical passage or channel 138, which is defined by a rear distribution member 140 having a conical surface 142 and a front distribution member 144 having an opposed conical surface 146. The rear distribution member 140 is connected to the rear housing member 134 by fasteners, such as rivets 141 or made integral with the rear housing member. The rotary bell element 120 further includes a central electrode having a relatively sharp tip portion 152 extending in the axis of the rotary bell element as illustrated schematically in FIG. 2I-A. The tip portion 152 of the axial electrode may have a diameter of between 0.2 to 1 mm, or between 0.3 to 0.6 mm, or about 0.5 mm. Tip portion 152 of the central electrode extends through a bowl-shaped depression 154 in end face 132. Bowl-shaped depression 154 may be shallow, arcuate and concentric relative to the axis of the rotary bell element and the tip portion 152 of the central electrode.

Tube 122 includes a plurality of radially spaced axial conductive pins 156 which are connected to a conductive tubular element 158 by suitable means including soldering or screws. The conductive tubular element 158 surrounds the body 160 of the non-conductive deflector 126 and a conductive coil spring 162 electrically connects the body 164 of the center electrode to the inlet tube 122 as best shown in FIG. 2I-A. In the disclosed embodiment, body 160 of diverter 126 has an enlarged cylindrical portion having axial grooves or notches (not illustrated) which receive conductive pins 156. This construction also prevents relative rotation of tube 122 and the diverter or deflector 126. In the disclosed embodiment, conductive pins 156 are generally rectangular in cross-section and extend through the annular passage 138 which may receive a powder or other particulate material. The rear housing element 134, which may be formed of aluminum, for example, includes an annular chamber 166 to reduce weight and a distal annular end portion 168 which supports the distal annular end portion 168 of the rear distribution member 140 as illustrated in FIG. 2I-A.

As set forth above, tube 122 is threadably connected to the rotary bearing of an atomizer body, and the rotary bearing is connected to a source of electric current (not shown) that typically impresses a voltage of between 50 to 90 KV on tube 122. As set forth above, the central axially extending electrode 148 is electrically connected to tube 122 and thus the tip portion 152 of the central electrode is electrostatically charged to generate a central axially extending electrostatic field. Further, the rotary bell element includes an annular electrostatically charged surface adjacent the end surface of the bell element, which generates an annular electrostatic field. As will be understood by those skilled in this art, the annular electrostatically charged surface of bell element 120 may be selected from the annular distal end 170 of the rear distribution member 140, wherein the rear housing 134 may be formed integrally with the rear distribution member 140. However, in certain embodiments, both the rear and front distribution members 140 and 144, respectively, may be formed of a conductive polymer, such as polytetrafluoroethylene, having a conductive filler and the annular distal end portion 178 is electrostatically charged by the tubular portion 158 of tube 122 and which is closest to the foam 18 and generates the annular electrostatic field. In certain embodiments, the annular surface 178 is essentially co-planar with the planar surface of the end face 132 as illustrated in FIG. 2I-A. Further, in this embodiment, the annular distal end 178 includes an annual groove 180 which receives an annular lip 182 of the end face 132, supporting the circular radial outer edge of the end face 132 as illustrated in FIG. 2I-A.

In use, a fluid or slurry enters tube 122 as illustrated in FIG. 2I-A by arrow 150 from the atomizer (not illustrated) and the fluid or slurry is received by the opposed conical surface 128 of the deflector or diverter 126. The conical surface 128 directs the fluid or slurry radially and axially through the annular conical channel or passage 138 as illustrated by arrows 186, which directs the fluid or slurry to the fluid or slurry overflow surface 170. The fluid or slurry is then electrostatically charged as it flows through the channel 138 by the opposed electrostatically charged surfaces 142 and 146. The electrostatically charged fluid or slurry is then "atomized" by the centrifugal force of the rapidly rotating atomizer bell, as described above, and the fluid or slurry is directed to the foam by the annular electrostatic field.

Electrostatic charging of sprays may be useful for high transfer efficiency. The charging is typically at high voltage (20 to 40 kV) but low current. An example of such a device illustrated schematically in FIGS. 2JA-D, modified slightly from U.S. Pat. No. 5,011,086. The apparatus illustrated in FIGS. 2JA-D, for electrically conductive fluids and slurries, comprises a spray device 205 with a rotary spray head 207 in the form of a rotating bell throwing the fluid or slurry off an outside edge 211, by rotation, and forming in the spray cloud area 209 located downstream from it a cloud of liquid or slurries particles which are separated from one another. Connected to this spray apparatus is a bundle 210 of several lines for feeding electrically conductive fluid or slurry from a grounded supply system and for feeding solvent. The solvent serves to pass through the spray coating apparatus, instead of the fluid or slurry, and clean from it fluid or slurry before changing over to another type of fluid or slurry, or at the end of a workday.

An electrode arrangement 212 is supported by a ring 214 from electrically insulating material, which ring concentrically surrounds the spray device 205. The downstream end 216 of the ring 214 has a distance 220 from the downstream end 218 of the rotary body 207, which distance may range between 0 mm and 50 mm. The radial distance between the outside edge 211 of the rotary body 207 and the radial center 224 on the downstream end of the ring 214 is marked 226 and may range between 50 mm and 250 mm. A number of electrodes 228 protrude out of the ring 214, on its downstream end 216, by a length 230. The length 230 may range from 0 mm to 50 mm. The electrodes 228 are arranged around the periphery of the ring 214, on its downstream end 216, at a uniform distribution and extend essentially axially parallel with the axis of rotation 232 of the rotary body 207. The ring 214 connects by way of strips 234 from electrically insulating material with the stationary part 236 of the rotary atomizer 205.

In accordance with the embodiment illustrated schematically in FIGS. 2J-A, 2J-B, 2J-C, and 2J-D, the ring 214 consists of two ring-shaped parts, namely a mounting ring 240 and a gas guide ring 242, each made of electrically insulating material. The gas guide ring 242 serves to pass the gas across the electrodes 228 and its outside surfaces in such a way that the gas, preferably air, will receive electrical charges from the electrodes 228 and inject them in the spray cloud area 209, thereby transferring the charges to the atomized, separate particles of the electrically conductive liquid or slurry.

Formed in the gas guide ring 242, axially parallel with the axis of rotation 232, is a number of first gas channels 252 corresponding to the number of electrodes 228. These each contain one of the electrodes 228, are arranged at a symmetric distribution around the ring-shaped gas guide ring 242 and each extend from an angular groove 47 in the upstream front 276 up to the downstream end 216 of the gas ring 242. The angular groove 247 contains a ring-shaped electrical conductor 280 to which the electrodes 228 are connected and which forms between itself and the bottom of the angular groove 247 a first angular channel 278 that is connected to at least one first gas feed line 249. An electrical high voltage line 290 is connected to the electrical conductor 280. The electrodes 228 are swept by the gas passing through the gas channels 252. The gas guide ring 242 is installed in an angular groove 244 on the downstream side of the mounting ring 240, leaving between both parts a second angular channel 246, which is connected to at least one gas feed line 248 that is located on the upstream side 250 of the ring 214. A second gas channel 256, which may have the shape of an angular slot or be a number of small ring-shaped openings, extends from the angular groove 244 on the downstream side 258 of the mounting ring 240 to a radially outer surface 260 of the gas guide ring 242. The gas flows through the second gas channel 252 from the second angular channel 246 at the radially outer outside surface 260 and across it to the downstream end 216, where the gas flows across the protruding end sections 262 of the electrodes 228 and mixes with the gas from the first gas channels 252. Both gas flows pick up electrical charges from the electrodes 228 and transfer them to the particles of the atomized, electrically conductive coating liquid in the spray cloud area 209. A third gas channel 266, which may have the form of a ring-shaped slot or of openings arranged in ring fashion, extends from the second angular channel 246 down to the downstream side 258 of the mounting ring 240 on the radially inner outside surface 268 of the gas guide ring 242. The gas of this third gas channel 256 flows as well across the protruding end sections 262 of the electrodes 228, mixes with the other gas and transfers together with it electrical charges from the electrodes 228 to the particles of the atomized coating liquid. A high charge of electrical energy is transferred thereby from the electrodes to the particles of the atomized electrically conductive coating liquid, and the outside surfaces 260 and 268 of the gas guide ring 242 are thus kept clean of gas by preventing particles of the coating liquid to proceed on these outside surfaces. The gas prevents a backflow of particles of the coating liquid, upstream from the spray cloud area 209 toward the electrode arrangement 212, so that the outside surfaces 270 of the mounting ring 240 cannot become contaminated either by coating liquid.

As can be seen from FIGS. 2J-C and 2J-D, the second gas channel 256 and the third channel 266 are formed by a number of small openings between the mounting ring 240 and the gas guide ring 242. Spacers 272 are contained in the angular groove 244 between the mounting ring 240 and the gas guide ring 242.

The separate gas feed lines 249 and 247 enable a separate adjustment and control of the gas supplied to the first gas channels 278, 252 and the second and third gas channels 256 and 266.

The ring 214 has a shape which in a direction downstream from the spray head 207 diminishes cross-sectionally in the form of a wedge, in that the mounting ring has a considerably shorter axial dimension than the gas guide ring 242 and the gas guide ring has in axial section a triangular shape, as can be seen specifically from FIGS. 2J-C and 2J-D. The outside surfaces 270 of the mounting ring 240 extend into one another in bow fashion, according to FIGS. 2J-C and 2J-D. The entire cross-sectional shape of the ring 214 is thus aerodynamic in the direction downstream from the spray head 207. The second gas channel 256 extends essentially parallel with the radially outer outside surface 260 while the third gas channel 266 extends essentially parallel with the radially inner outside surface 268 of the gas guide ring 242. These gas channels are very short. The gas discharge direction of the second and third gas channels 256 and 266 is so selected that their gas flows will closely sweep across the outside surfaces 260, 268 of the gas guide ring 242 in the direction toward the downstream end 216.

Ultrasonic atomizer spray nozzles utilize high frequency (20 kHz to 50 kHz) vibration to produce narrow drop-size distribution and low velocity spray from a liquid. The vibration of a piezoelectric crystal causes capillary waves on the nozzle surface liquid film. An example of such a device illustrated schematically in FIGS. 2K-A and 2K-B, modified slightly from U.S. Pat. No. 4,723,708. One embodiment of an ultrasonic atomizing transducer assembly 310 includes a transducer 312 having a driving element 313, a rear dummy section 314, and a front atomizing section 315. Driving element 313 is assembled from a washer-shaped metal electrode 316 sandwiched between a pair of annular piezoelectric disks 317 and 318. The electrode may be made of copper or any other suitable metal having high electrical conductivity, and it is provided with a terminal 319 for attachment to a source of electrical energy at the resonant frequency of the transducer. The piezoelectric disks are made of any material conventionally used for such service, such as barium titanate or lead zirconate titanate. Rear dummy section 314 is a metal cylinder, preferably titanium, having a length equal to a quarter wavelength at the designed operating frequency of the transducer. A front end 320 of rear section 314 contacts rear piezoelectric disk 318, and a rear end 321 of the rear section is free to vibrate as an antinodal plane. Front atomizing section 315 includes a cylindrical portion 322 having a rear end 323 that contacts front piezoelectric disk 317 and a front end 324 that lies in a nodal plane, cylindrical portion 322 being designed to be one-half wavelength long at the operating frequency of the transducer. From the front end of the cylindrical portion 322, a quarter wavelength amplifying probe 325 extends to a frustoconical tip 326 having an atomizing surface 327. The front atomizing section preferably is made of the same material as the rear dummy section, although a different material could be used if desired, so long as the appropriate wavelength dimensions were used to match the operating frequency of the rear section.

Except for a narrow circumferential flange 328 at the rear end of the front section, the outer diameter of the transducer is equal to the diameters of the front and rear sections. These sections are clamped against the driving element 313 with a predetermined compressive stress by a central tubular bolt 329 that is formed as an enlarged threaded stud on the end of a liquid feed tube 330. The tubular bolt engages an internally threaded enlarged portion 331 of an axial passage 332 that extends through the transducer from the rear end of the rear dummy section 314 to open onto the atomizing surface 327 at the tip of the probe 325. To prevent liquid flowing through the delivery tube 330 into the passage 332 from penetrating past the threaded portion of the front section and contacting the internal surfaces of the piezoelectric disks, an O-ring seal 333 is provided between a smooth sealing surface 334 machined on the front end of the central bolt 329 and the inner surface of the passage 332. As illustrated, the O-ring is fitted into a circumferential groove machined into the wall of the passage to assure that the O-ring is properly located with respect to the sealing surface 334. The groove could equally well be formed on the end of the bolt, or any other conventional sealing arrangement could be used between the end of the bolt and the inner surface of the passage in the front section. An additional O-ring 335 is provided to seal between the outer circumference of the feed tube 330 and the inner circumference of the axial passage. This second O-ring prevents ingress of moisture from the environment surrounding the atomizer. Because there are no clamping flanges on the transducer body to provide an annular area for a compressed ring gasket around the outside of the driving element, the outer peripheries of the piezoelectric disks are protected by an enclosed shell 336. This shell is in the form of a cylindrical cup 337 having a screw cap 338. The cup 337 has an end wall provided with an opening 340, which receives the cylindrical portion 322 of the front section of the transducer. This opening is sealed by a radially compressed O-ring 341 disposed between the outer circumference of the cylindrical portion 322 and a counterbore in the opening 340. Screw cap 338 has an end wall 343 with a similar but smaller opening 344. An O-ring 345 in a counterbore 346 seals this opening in the same way as O-ring 341 seals the front opening. As illustrated, O-ring 345 is radially compressed between the counterbore 346 and a cylindrical collar 347 extending from the end 321 of the rear dummy section. The procedure for assembling the transducer, mounting the atomizer, and connecting liquid delivery conduits is further discussed in the U.S. Pat. No. 4,723,708. Liquid may be delivered to the rear of the unit via a flexible hose (not shown) connected to the delivery tube 330 by the standard coupling connectors 352 (see FIG. 2K-A). Alternatively, the assembly can be supported by a rigid liquid supply pipe coupled to the delivery tube 330. After the driving element is assembled on bolt 329, O-ring 335 is fitted over feed tube 330, and the rear dummy section 314 is then screwed down against the driving element. The proper compression force may be obtained by applying a torque wrench to two diametrically spaced detent holes 348 drilled in the rear end 321 of rear dummy element 314. A lead wire 349 attached to a hermetically sealed coaxial fitting 350 mounted on the end wall of the cap is clipped or soldered to a terminal of the center electrode 316. The cap 338 may be tightened using a spanner wrench fitting the detent holes 351 in the end wall of the cap.

FIG. 1D is a schematic transverse cross-sectional view of another system embodiment 300 within the present disclosure. Embodiment 300 features one or more apertures 20 in roof 10 of a downstream apparatus 4 configured to route one or more fluids or slurries 40 onto at least a portion of foam layer 18. The fluid or slurry may be supplied from one or more supply tanks or containers 42, 44, which are fluidly and mechanically connected to downstream apparatus 4 via one or more conduits 46, which may or may not include flow control valves 48. One or more of the conduits may be flexible metal hoses, such as illustrated at 50, but they may also be solid metal, ceramic, or ceramic-lined metal conduits. Any or all of the conduits 46, 50 may include a flow control valve, which may be adjusted to shut off flow through a particular conduit. Only one control valve 48 is illustrated for clarity. As illustrated in FIG. 1D, fluid or slurry 40 falls by gravity and directly impinges a portion or portions of foam layer 18, thereby destroying at least some of the foam.

Those skilled in this art will readily recognize after having read this disclosure that systems and methods comprising combinations of any two or more of the various embodiments described herein may be combined. For example, systems and methods where one or more low momentum non-submerged burners impinge on foam, such as in embodiment 100, may also include one or more nozzles delivering other compositions, as in embodiment 200.

In order to determine which of the many foam de-stabilization apparatus and techniques may work best for any given situation may take a small amount of experimentation, but the degree of experimentation is not considered to be extensive or undue. Basically, the molten mass of glass and foam is allowed to enter the downstream apparatus and one or more of the foam de-stabilization techniques described herein begun soon thereafter, and tuned to achieve the greatest de-stabilization effect on the foam. If the foam for some reason is so stable as to not be affected at all by the particular de-stabilization apparatus or method, it may simply be discontinued.

Systems and methods of the present disclosure may be combined with other strategies for foam de-stabilization. Systems and methods of the present disclosure decrease bubble stability when used separately or in conjunction with one or more downstream methods. For example, adding nitrogen as a treating composition to the molten mass of glass and bubbles in the downstream apparatus may tend to make bubbles in foam 18 less stable when there is the presence of a high moisture atmosphere in the downstream apparatus. A high moisture atmosphere may exist in the downstream apparatus for example when one or more high momentum burners (whether oxy/fuel or not) are used as impingement burners in the downstream apparatus to impinge on foam 18. The use of one or more high momentum impingement burners (whether oxy/fuel or not) in a downstream flow channel is described in assignee's co-pending application Ser. No. 13/493,170, filed Jun. 11, 2012, (now U.S. Pat. No. 8,707,739.

Measuring effectiveness of the foam de-stabilization systems and methods described herein may generally be made by taking samples of the molten mass of glass and counting bubbles and their size in the molten mass, or a solidified or partially solidified sample thereof, using the naked eye. Another naked eye measurement may simply be comparing an acceptable glass to a glass sample made using a system and method of the present disclosure, and making a naked eye comparison. Another method would be to simply observe the height of foam or bubbles within a channel or other downstream apparatus, using graduated marks on refractory materials to serve as a ruler, or use of known heights of construction materials for the sidewalls to access the height of the foam. More sophisticated methods and equipment may certainly be used, such as image analysis using computers to measure size, size distribution and quantity of bubbles (or other parameters) within a high-resolution photograph or micrograph of the material to be analyzed. For example, companies such as Glass Service market methods and equipment for such measurements. The glass melting method, as well as phenomena within the melt, may be continuously observed, recorded and evaluated using a high temperature observation furnace equipped with a special silica observation crucible. This equipment may be further coupled with image analysis equipment to provide easy manipulation of recorded data. For example, in a "melt test", the objective is to evaluate the fining characteristics of differing batch compositions. The area of the recorded images occupied by inhomogeneities (bubbles), bubble size distribution, bubble number, as well as bubble growth rates vs. melting time, may be evaluated to provide comparison between individual batches. The records of the melting course may be provided in the form of video files, which may be displayed on a personal computer, handheld computer, or other viewer. Bubble growth rate, or shrinkage rate, or rate of disappearance measurements may be based on direct observation and recording of bubble sizes depending on time. It is possible to keep bubbles suspended in the melt for hours by the developed "shuttle" method.

In embodiments of the present disclosure, a reduction of 5 percent, or 10 percent, or 20 percent, or 30 percent or more of foam may be acceptable. In other embodiments, nothing short of complete or substantially complete foam or bubble removal will suffice, in other words 90 percent, or 95 percent, or 99 percent, or even 99.9 percent reduction in foam and bubbles.

Figure 3:
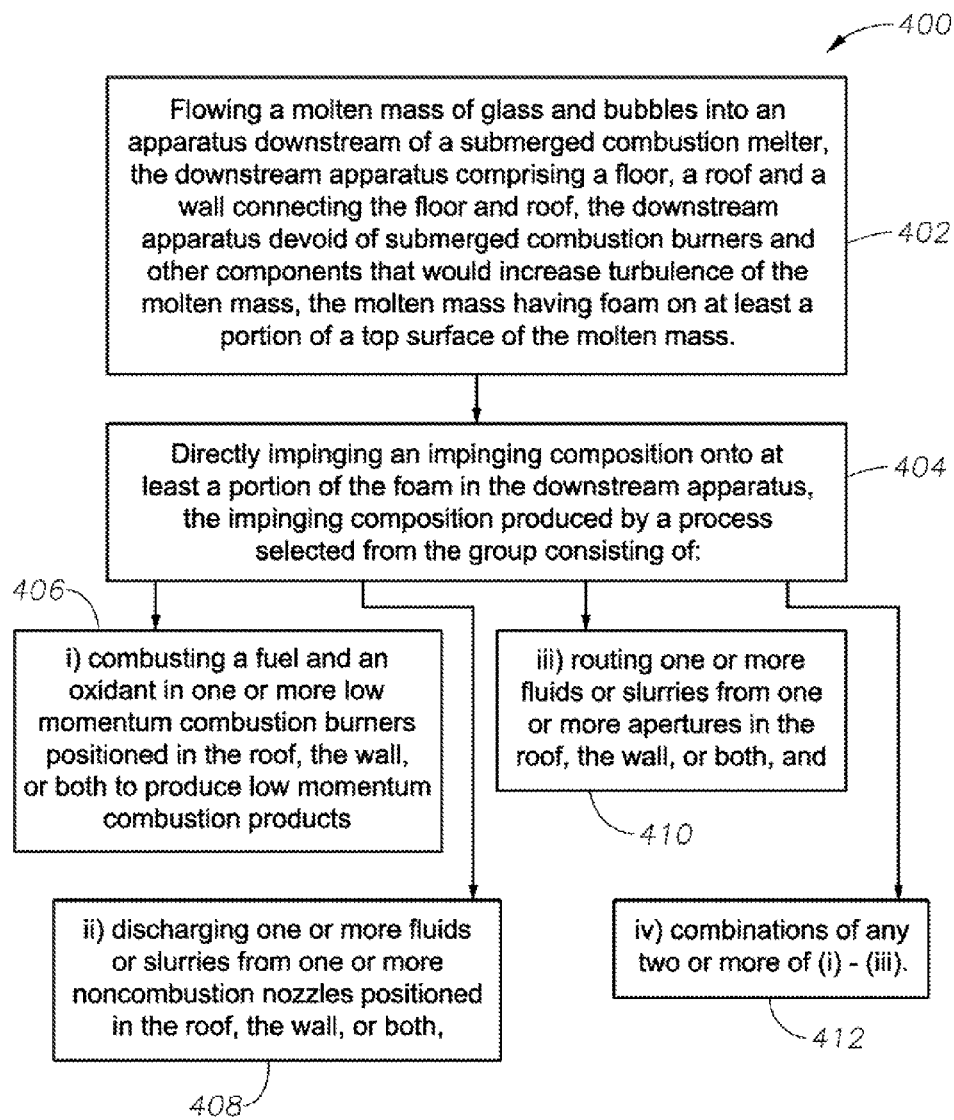
FIG. 3 is a logic diagram of one method embodiment of the present disclosure.

FIG. 3 is a logic diagram of one method embodiment 400 of the present disclosure. Method embodiment 400 includes flowing a molten mass of glass and bubbles into an apparatus downstream of a submerged combustion melter, the downstream apparatus comprising a floor, a roof and a wall connecting the floor and roof, the downstream apparatus devoid of submerged combustion burners and other components that would increase turbulence of the molten mass, the molten mass having foam on at least a portion of a top surface of the molten mass, box 402. The method further comprises directly impinging an impinging composition onto at least a portion of the foam in the downstream apparatus (box 404), the impinging composition produced by a process selected from the group consisting of: i) combusting a fuel and an oxidant in one or more low momentum combustion burners positioned in the roof, the wall, or both to produce low momentum combustion products (box 406), ii) discharging one or more fluids or slurries from one or more non-combustion nozzles positioned in the roof, the wall, or both (box 408), iii) routing one or more fluids or slurries from one or more apertures in the roof, the wall, or both (box 410), and iv) combinations of any two or more of (i)-(iii) (box 412).

The downstream apparatus 4 may include one or more bushings (not illustrated) for example when producing glass fiber (not illustrated). Downstream apparatus for use in systems and methods of the present disclosure may comprise a roof, floor and sidewall structure comprised of an outer metal shell, non-glass-contact brick or other refractory wall, and glass-contact refractory for those portions expected to be in contact with molten glass. Downstream apparatus may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The downstream apparatus may be rectangular as illustrated in the various figures, or may be a shape such as a generally U-shaped or V-shaped channel or trough of refractory material supported by a metallic superstructure.

The flow rate of the molten glass through downstream apparatus 4 (unless it is a holding container without flow) will depend on many factors, including the geometry and size of the SCM and downstream apparatus, temperature of the melt, viscosity of the melt, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Low momentum non-submerged burners useful in systems and methods of this disclosure may include some of the features of those disclosed in assignee's U.S. Ser. No. 13/268,130, filed Oct. 7, 2011. For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

Submerged combustion melters may be fed a variety of feed materials. The initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. Publication Nos. 2007/0220922 and 2008/0276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1 borrowed from U.S. Publication No. 2007/0220922. Notice that during glass melting, carbon dioxide (from lime) and water (borax) evaporate. The initial raw material can be provided in any form such as, for example, relatively small particles.

TABLE 1

A typical E-glass batch
BATCH COMPOSITION (BY WEIGHT)

| Raw material | Limestone (Baseline) | Quicklime | Ca Silicate | Volcanic Glass | Ca Silicate & Volcanic Glass | Quartz-free #1 | Quartz-free #2 | Limestone Slag | Ca Silicate Slag | Quartz-free #3 | Quartz and Clay Free | Ca Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |

TABLE 1-continued

A typical E-glass batch
BATCH COMPOSITION (BY WEIGHT)

| Raw material | Limestone (Baseline) | Quick-lime | Ca Silicate | Volcanic Glass | Ca Silicate & Volcanic Glass | Quartz-free #1 | Quartz-free #2 | Limestone Slag | Ca Silicate Slag | Quartz-free #3 | Quartz and Clay Free | Ca Silicate/ Feldspar |
|---|---|---|---|---|---|---|---|---|---|---|---|---|
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of CO2@ 1400 C. | 1668 | 0 | 0 | 1647 | 0 | 0 | 0 | 1624 | 0 | 0 | 0 | 0 |

SCMs may also be fed by one or more roll stands, which in turn supports one or more rolls of glass mat, as described in assignee's co-pending application U.S. Ser. No. 12/888,970, filed Sep. 23, 2010, incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass batch feeder. Glass batch feeders are well-known in this art and require no further explanation.

Downstream apparatus may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain embodiments may comprise a method control scheme for the downstream apparatus. For example, as explained in the '970 application, a master method controller may be configured to provide any number of control logics, including feedback control, feed-forward control, cascade control, and the like. The disclosure is not limited to a single master method controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to one or more foam de-stabilization elements, and/or to local devices associated with foam de-stabilization elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application U.S. Ser. No. 13/268,065, filed Oct. 7, 2011, using the vibrations and oscillations of the melter itself, may prove useful predictive control inputs.

The downstream apparatus floors and sidewall structures may include a glass-contact refractory lining. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in downstream apparatus described herein may be cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the downstream apparatus, components that require resistance to high temperatures, such as particle guns, rotating blades and paddles, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the geometry of the downstream apparatus and the foam de-stabilization equipment used, and the type of glass to be produced.

Those having ordinary skill in this art will appreciate that there are many possible variations of the systems and methods described herein, and will be able to devise alternatives and improvements to those described herein that are nevertheless considered to be within the claims.

What is claimed is:

1. A method comprising:
   producing a turbulent molten mass of glass and stable bubbles in a submerged combustion melter;
   flowing the molten mass of glass and stable bubbles into a flow channel positioned downstream of the submerged combustion melter, the flow channel selected from the group consisting of a conditioning channel, a distribution channel, and a forehearth, the flow channel devoid of submerged combustion burners and other components that would increase turbulence of the molten mass, the molten mass having a submerged combustion melter generated foam comprising the stable bubbles on at least a portion of a top surface of the molten mass; and
   de-stabilizing the submerged combustion melter foam by directly impinging an impinging composition onto at least a portion of the submerged combustion melter generated foam in the flow channel, the impinging composition produced by a process selected from the group consisting of:
   i) combusting a fuel and an oxidant in one or more low momentum non-submerged combustion burners positioned in the roof, the wall, or both of the flow channel to produce low momentum combustion products,
   ii) discharging one or more non-combustible fluids or slurries from one or more nozzles positioned in the roof, the wall, or both of the flow channel,
   iii) routing one or more fluids or slurries from one or more apertures in the roof, the wall, or both of the flow channel, and
   iv) combinations of any two or more of (i)-(iii).

2. The method of claim 1 wherein the combusting of the fuel and oxidant in one or more low momentum non-submerged combustion burners positioned in the roof, the wall, or both of the flow channel comprises combusting at least a portion of the fuel and oxidant in one or more burner blocks in the wall, the roof, or both the wall and the roof of the flow channel.

3. The method of claim 2 wherein the combusting of the fuel and oxidant in one or more low momentum non-submerged combustion burners positioned in the roof, the wall, or both of the flow channel comprises pulsing flow of the oxidant, the fuel, or both to one or more of the low momentum non-submerged combustion burners.

4. The method of claim 1 wherein the combusting of the fuel and oxidant in one or more low momentum non-submerged combustion burners positioned in the roof, the wall, or both of the flow channel comprises routing at least a portion of the combustion product gases from one or more position adjustable burners in the wall, the roof, or both the wall and the roof of the flow channel.

5. The method of claim 4 wherein the combusting of the fuel and oxidant in one or more low momentum non-submerged combustion burners positioned in the roof, the wall, or both of the flow channel comprises pulsing flow of the oxidant, the fuel, or both to one or more of the low momentum non-submerged combustion burners.

6. The method of claim 1 wherein the combusting of the fuel and oxidant in one or more low momentum non-submerged combustion burners positioned in the roof, the wall, or both of the flow channel comprises pulsing flow of an oxidant, a fuel, or both to one or more of the low momentum non-submerged combustion burners.

7. The method of claim 1 wherein the combusting of the fuel and oxidant in one or more low momentum non-submerged combustion burners positioned in the roof, the wall, or both of the flow channel comprises the burners having a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

8. The method of claim 1 wherein the combusting of the fuel and oxidant in one or more low momentum non-submerged combustion burners positioned in the roof, the wall, or both of the flow channel comprises routing the fuel and an oxidant-enriched oxidant to one or more of the low momentum non-submerged combustion burners, and routing products of combustion of the fuel and the oxidant-enriched oxidant from the one or more low momentum non-submerged combustion burners.

9. The method of claim 1 wherein the flowing of the molten mass of glass and bubbles into the flow channel comprises the flow channel positioned immediately downstream of the submerged combustion melter.

* * * * *